United States Patent Office 2,826,487
Patented Mar. 11, 1958

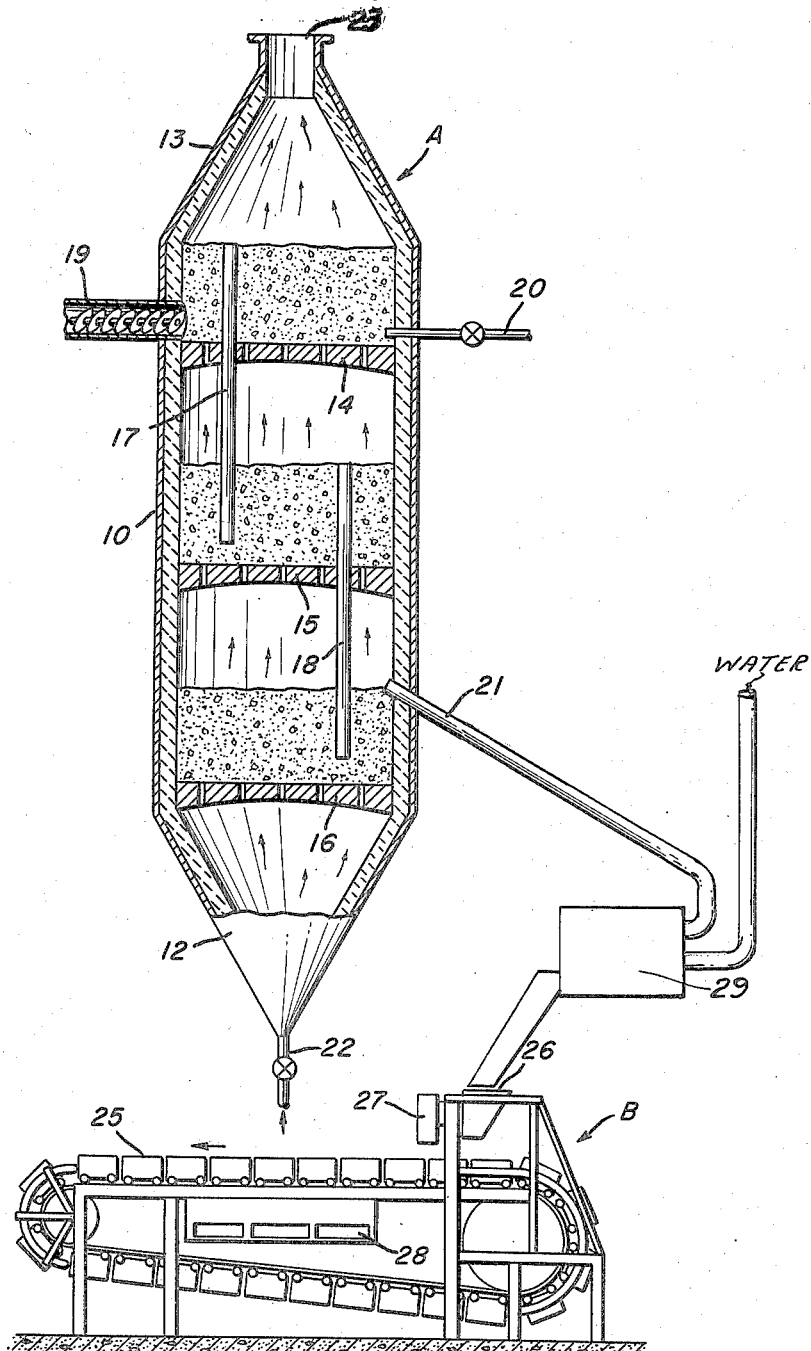

2,826,487

METHOD OF SINTERING ORE FINES

William L. Davis, Jr., Hammond, Ind., assignor to United States Steel Corporation, a corporation of New Jersey Application July 7, 1955, Serial No. 520,421

2 Claims. (Cl. 75—5)

This invention relates to an improved method of sintering iron ore fines.

Conventionally before iron ore fines are sintered, they are mixed with a solid carbonaceous fuel, such as coal or coke dust. The mixture is charged continuously through a swinging spout to a moving downdraft grate, where it forms a bed several inches thick. The upper surface of this bed is ignited just beyond the charging spout, and the fuel therein burns in a narrow combustion zone which slopes toward the discharge end of the grate. In this zone iron ore particles attain a temperature of about 2200° F., at which they soften and frit together. The resulting product has high mechanical strength, and a porous, sponge-like structure that affords a large surface exposure.

An object of the present invention is to provide an improved sintering method which eliminates the need for adding solid fuel to iron ore and the attendant handling and mixing problems.

A further object is to provide a sintering method in which iron ore is partially reduced and charged to the sintering machine without additional fuel, the reduced ore furnishing its own oxidizable material for the sintering operation.

A more specific object is to provide a sintering method in which iron ore fines are treated with a reducing gas to produce a sinter feed predominantly ferrous oxide, and this feed is sintered without additional fuel, the reducing treatment being controlled to keep both magnetite and metallic iron in the feed to a minimum.

The single figure of the drawing is a diagrammatic sectional view of a typical apparatus for performing the method of my invention.

The apparatus comprises essentially a reactor A and a sintering machine B, both of which individually can be of known construction. Preferably the reactor is of a type in which solid particles can be maintained as a fluidized bed resembling a boiling liquid by introduction of gas from beneath. Iron ore fines are introduced to the top of the reactor and reducing gas to the bottom and the temperature is maintained at 1100 to 1400° F. A reduced product predominantly ferrous oxide discharges from the reactor and is fed to the sintering machine. There it forms a bed which is ignited and burned in the usual way. The sinter discharges from the opposite end of the machine and is ready for further treatment, as in a blast furnace. Preferably the process is continuous, although obviously it can be on a batch basis if desired. While a traveling sinter bed is preferred, a stationary bed could be used without departing from my invention.

In more detail, the reactor A illustrated is a heat-insulated vessel which includes a main cylindrical portion 10 and bottom and top conical portions 12 and 13. The vessel contains upper, central and lower fixed perforated plates 14, 15 and 16 which divide it into compartments. The upper and central plates 14 and 15 carry standpipes 17 and 18 respectively. An ore feeder 19 (for example a screw conveyor) and an air inlet 20 lead to the uppermost compartment. A product discharge pipe 21 leads from the compartment above the lower plate 16. The bottom and top conical portions 12 and 13 have a gas inlet and discharge 22 and 23 respectively.

Preheated reducing gas is introduced to the lowermost compartment beneath the lower plate 16 via the inlet 22. The reducing constituent of this gas preferably is a mixture of hydrogen and carbon monoxide obtained by reforming natural gas according to known procedures, although other reducing gases, such as hydrogen alone, carbon monoxide alone, natural gas, or coke oven gas can be used. To assure that the ore is reduced only to FeO and not to metallic iron, the reducing gas can be diluted with $CO_2$ and $H_2O$ to furnish $CO_2/CO$ and $H_2O/H_2$ ratios that are above the equilibrium ratios effective for reducing the material to metallic iron. Iron ore fines are introduced to the uppermost compartment via the feeder 19. The ore can be as coarse as minus ⅜ inch and can be any of the commonly occurring oxide ores, such as hematite, magnetite, martite, goethite, limonite, or taconite concentrate. The gas passes upwardly through the successive perforated plates and the ore downwardly via the standpipes 17 and 18. The superficial gas velocity is in the range of about 0.4 to 1.5 feet per second, with the optimum being about 0.8 foot per second. At such velocities the gas causes the ore on each plate to form a fluidized bed which behaves similarly to a liquid. Consequently ore at the upper portions of the respective beds overflows through the standpipes 17 and 18 and the discharge pipe 21.

The ore is preheated in the top bed by heat obtained from burning the gas which reaches this bed from below with air introduced via the inlet 20, and also by the sensible heat in this gas. Actual reduction of the ore takes place in the central bed, where the materials are at a temperature of 1100 to 1400° F. Higher temperatures are objectionable, since they tend to cause sticking, while lower temperatures do not produce sufficiently rapid reaction rates. Process conditions are regulated to reduce the ore to a uniform product predominantly ferrous oxide. When the reducing constituents of the reducing gas are a typical mixture of carbon monoxide and hydrogen, the reaction is endothermic. In the reactor shown the heat necessary for the reaction is supplied by combustion of the gas in the uppermost compartment. Nevertheless it is apparent any other conventional means for supplying heat to a fluidized bed could be substituted for the means shown. Commonly the ore is 25 to 35 percent reduced, depending on its initial stage of oxidation. Any greater reduction results in an over-burned sinter of low porosity and reducibility. The composition of the off-gas from the central bed is above the equilibrium gas composition for FeO to Fe reduction, but below that for $Fe_3O_4$ to FeO reduction, at the bed temperature. In the bottom bed the sensible heat of the reduced ore is used to preheat the gas. The product which discharges from the vessel is not pyrophoric. If desired, it can be stored, provided it is first cooled in an inert atmosphere, and the ore of course cools as it heats the gas. At ambient temperatures reoxidation is negligible.

The sintering machine B illustrated includes a traveling grate 25, a feed spout 26, and igniter 27 and a wind box 28, all of which operate in the usual way. Reduced ore from the reactor A is charged to the grate 25 to form the usual bed, which is ignited by the igniter 27. The wind box 28 draws a downdraft of air through the bed to support oxidation. Under these conditions ferrous oxide reoxidizes to form an excellent porous sinter of superior mechanical strength to ordinary sinter. The grate can be somewhat shorter than usual, since the reaction is more rapid. Only 6 to 12 minutes are required for sintering a 12 inch dry bed. The charge to the bed can be either dry or water tempered (approximately 7 to 10 percent water added). A water-tempering device is indicated diagrammatically at 29 in the drawing intermediate the reactor A and the sintering machine B. With a dry bed some sinter is returned to the feed to improve the permeability. With a water tempered bed no sinter need be returned, and the time for complete sintering can be even briefer.

As a specific example, a relatively pure hematite ore was introduced to the reactor, which ore had the following size analysis:

| Screen Size U. S. Standard | Percent Each Sample | Accumulative Percent |
|---|---|---|
| $-\frac{3}{8}"+4$ mesh | 7.1 | 7.1 |
| 12 | 11.1 | 18.2 |
| 20 | 7.0 | 25.2 |
| 40 | 8.4 | 33.6 |
| 60 | 8.3 | 41.9 |
| 80 | 7.4 | 49.3 |
| 100 | 6.5 | 55.8 |
| Pan | 44.2 | 100.0 |

A reducing gas whose reducing constituents consisted of carbon monoxide and hydrogen was also introduced thereto at a superficial velocity of 0.8 foot per second and the temperature maintained at about 1500° F. The ratios of $CO_2/CO$ and of $H_2O/H_2$ in the reducing gas were in the range where the gas was effective to reduce $Fe_2O_3$ to FeO, but not to reduce the latter to metallic iron. The gas was burned over the uppermost bed. The product discharging from the bottom bed was a uniform product whose composition was as follows:

| | Percent |
|---|---|
| Fe | 0.70 |
| FeO | 82.44 |
| $Fe_3O_4$ | 12.80 |
| Gangue | 4.06 |

This product was mixed with sufficient water to produce a 7.8 percent water content in the product and fed to the grate of the sintering machine to form a 12 inch bed, which was ignited in the usual way. The material was sintered under 24 to 36 inches of water vacuum, and the time required for complete sintering was only 3 minutes. The sinter had a median size of 0.51 inch and was 90 percent reduced after 174 minutes. Sinter produced by conventional methods ranges from 0.20 to 0.30 inch in median size and requires about 177 minutes for 90 percent reduction.

From the foregoing description it is seen that the present invention affords a simplified sintering method that eliminates need for solid fuels. In effect the invention substitutes gaseous fuel, since gas is used to reduce the ore sufficiently that it furnishes its own fuel. This substitution is advantageous in areas which lack solid fuels but have natural gas. The sinter is superior to normal sinter and is more easily produced in the sintering machine. Usual sintering operations require that the ore and fuel be intimately mixed by mechanical means. Even the best mechanical mixing cannot achieve the uniformity inherent in the sinter feed utilized in my method.

While I have shown and described only a single embodiment of my invention, it is apparent that modifications may arise. Therefore, I do not wish to be limited to the disclosure set forth but only by the scope of the appended claims.

I claim:

1. A method of sintering iron ore fines consisting predominantly of $Fe_2O_3$ and $Fe_3O_4$, which method comprises treating the ore in a fluidized bed at a temperature of 1100 to 1400° F. with an ascending current of reducing gas to reduce the ore to a uniform product consisting essentially of FeO, the reducing constituents of said gas being selected from the group which consists of carbon monoxide, hydrogen and mixtures thereof, the ratios of $CO_2/CO$ and $H_2O/H_2$ in said gas being above the maxima capable of reducing FeO to metallic iron but within the range effective to reduce $Fe_2O_3$ and $Fe_3O_4$ to FeO, cooling said reduced product, tempering the cooled reduced product with water to produce a water content of 7 to 10 percent, feeding the water tempered product to a sinter bed, igniting the product in the bed, and reoxidizing the product in the bed with the FeO therein furnishing the sole source of fuel.

2. A method as defined in claim 1 in which the reduced product is cooled by contact with incoming reducing gas in a second fluidized bed.

References Cited in the file of this patent

UNITED STATES PATENTS

| 962,006 | Cornell | June 21, 1910 |
| 986,271 | Dicke | Mar. 7, 1911 |
| 1,123,672 | Borch | Jan. 5, 1915 |
| 1,447,071 | Giesecke | Feb. 27, 1923 |
| 2,711,368 | Lewis | June 21, 1955 |

FOREIGN PATENTS

| 7,707 | Great Britain | of 1913 |
| 9,901 | Great Britain | of 1911 |
| 187,220 | Great Britain | Dec. 20, 1923 |
| 208,579 | Great Britain | Dec. 14, 1923 |
| 460,645 | Great Britain | 1937 |

OTHER REFERENCES

Comprehensive Treatise on Inorganic and Thoretical Chemistry, by Mellor, vol. 13, pp. 710 and 715. Pub. 1934.

U. S. DEPARTMENT OF COMMERCE
PATENT OFFICE

CERTIFICATE OF CORRECTION

Patent No. 2,826,487                                   March 11, 1958

William L. Davis, Jr.

It is hereby certified that error appears in the printed specification of the above numbered patent requiring correction and that the said Letters Patent should read as corrected below.

Column 2, line 57, after "gas" and before the period insert --, and the ore of course cools as it heats the gas--; lines 59 and 60 strike out ", and the ore of course cools as it heats the gas";

Signed and sealed this 29th day of April 1958.

(SEAL)
Attest:

KARL H. AXLINE
Attesting Officer

ROBERT C. WATSON
Commissioner of Patents